S. LUCE.
Harvester-Platforms.

No. 157,918. Patented Dec. 22, 1874.

WITNESSES:

INVENTOR:

UNITED STATES PATENT OFFICE.

SIMEON LUCE, OF SYRACUSE, NEW YORK, ASSIGNOR TO WILLIAM WALLACE, OF SAME PLACE.

IMPROVEMENT IN HARVESTER-PLATFORMS.

Specification forming part of Letters Patent No. 157,918, dated December 22, 1874; application filed September 14, 1874.

*To all whom it may concern:*

Be it known that I, SIMEON LUCE, of Syracuse, Onondaga county, New York, have invented certain Improvements in Harvester-Platforms, of which the following is a specification:

Heretofore great difficulty has been experienced in properly directing the cut grain falling onto the platform of self-rakers and delivering the same in a compact form, especially where the grain is tall, and this difficulty is still further increased in cutting tall corn-fodder, &c.

It is to obviate the difficulties heretofore encountered, and to supply a want long needed, that my devices have been made and practically proved of great value.

The construction is described as follows, referring to the accompanying drawing, in which—

Figure 1:
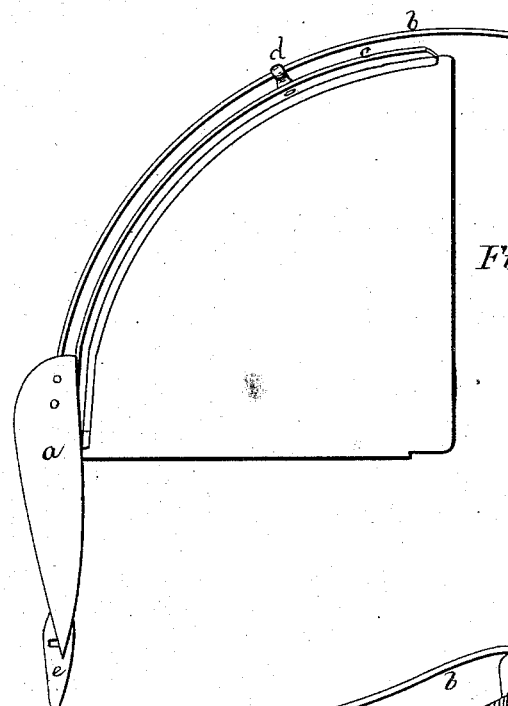
Figure 2:
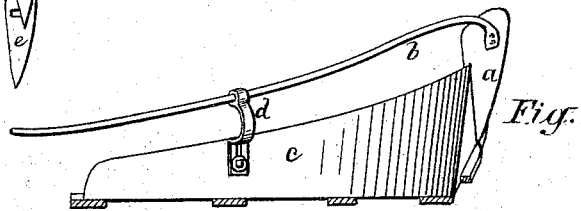
Figure 3:
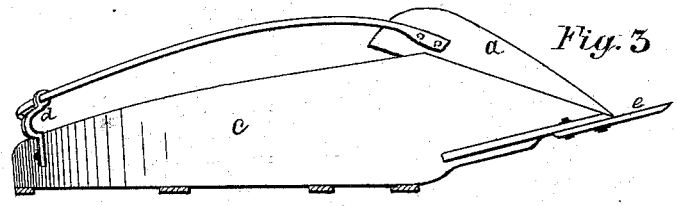

Figure 1 is a top plan, Fig. 2 is a rear view, Fig. 3 is a side view, of the improvements.

To the divider $a$ of the outer end of the platform, constructed in the well-known form, I affix a rod, $b$, which bends around above the curb-board $c$, and a little in the rear thereof, curving inward, more or less, at its end, which projects some distance beyond the end of the curb-board $c$. This extension of the rod $b$ is very important to gather the grain in and turn its heads around all one way, causing it to fall compactly from the platform at right angles to the track of the harvester. To support this long curved rod $b$ and hold it in its proper place I affix to the curb $c$ a standard or brace, $d$, which curves backward above the curb to clear the heads of grain that may drop below the rod. The rod $b$ is attached to the upper end of the brace, which has an adjustable fastening to the curb, so that it can be raised or lowered to elevate or depress the outer end of the rod to suit different heights of grain.

In cutting heavy cornstalks and the like, where it may be necessary to gather in and cut two or more rows, I affix to the point of the outer divider a nose-piece, $e$, projecting beyond the ordinary divider, as represented in Figs. 1, 3, to insure a proper direction to the long stalks. This can be removed in cutting smaller grain.

In the above-described improvements, I claim—

In combination with the platform and its curb $c$, the curved rod $b$, adjustably supported above and in rear of the curb and extending beyond the rear end of the curb and platform, substantially as and for the purpose described.

SIMEON LUCE.

Witnesses:
PETER B. McLENNAN,
J. J. GRENOUGH.